No. 750,501. PATENTED JAN. 26, 1904.
A. B. TARBOX.
STUD AND PIN COUPLING.
APPLICATION FILED APR. 3, 1903.
NO MODEL. 2 SHEETS—SHEET 1.

WITNESSES
INVENTOR
Alfred B. Tarbox

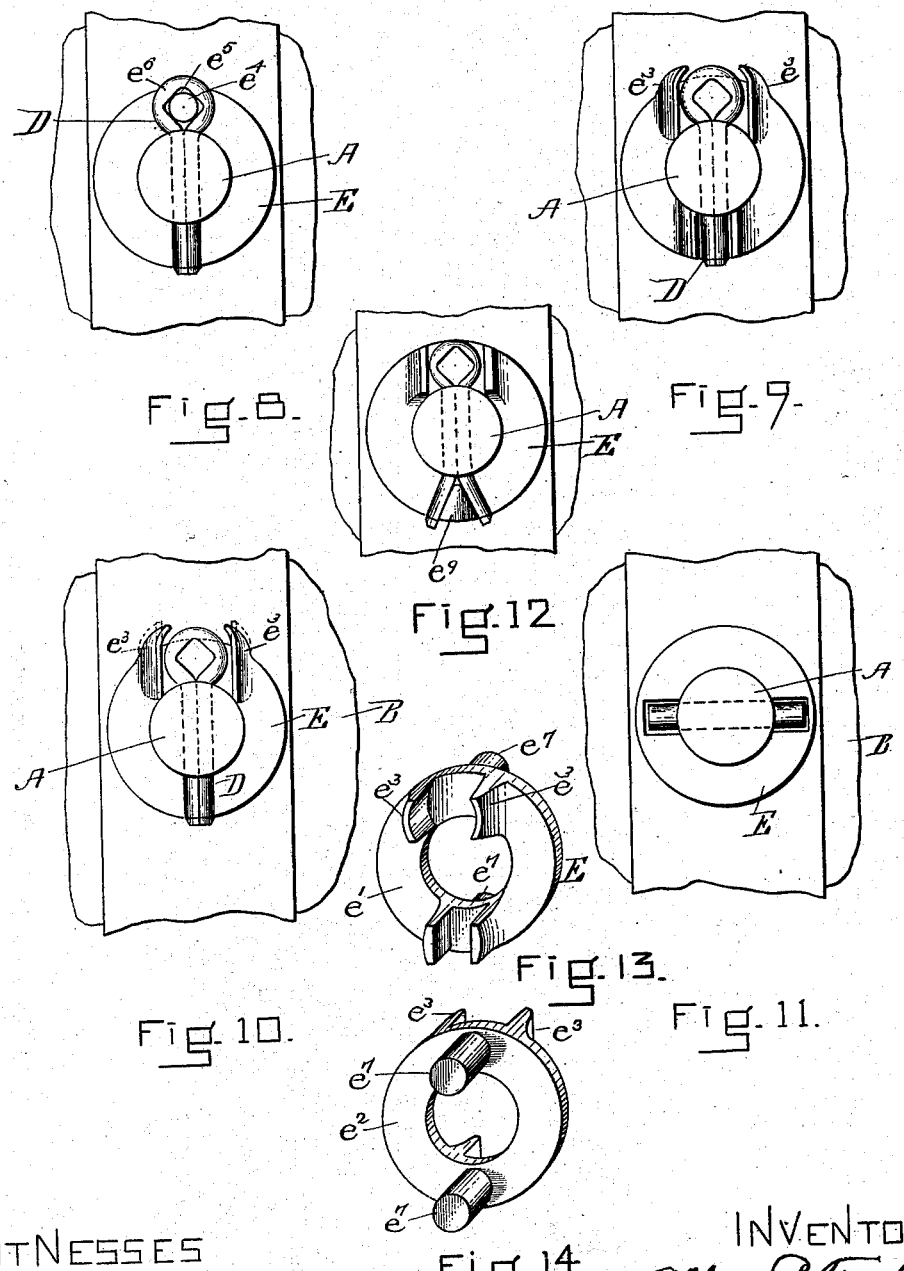

No. 750,501. Patented January 26, 1904.

UNITED STATES PATENT OFFICE.

ALFRED B. TARBOX, OF CHELSEA, MASSACHUSETTS.

STUD AND PIN COUPLING.

SPECIFICATION forming part of Letters Patent No. 750,501, dated January 26, 1904.

Application filed April 3, 1903. Serial No. 150,972. (No model.)

*To all whom it may concern:*

Be it known that I, ALFRED B. TARBOX, a citizen of the United States, residing at Chelsea, in the county of Suffolk and State of Massachusetts, have invented a new and useful Improvement in Stud and Pin Couplings, of which the following is a full, clear, and exact description, reference being had to the accompanying drawings, forming a part of this specification, in explaining its nature.

Studs which it is desired shall be stationary in their supports or holders and upon which wheels, pulleys, or rolls are mounted in a manner to turn thereon often become loose in their supports and instead of remaining stationary, as is desired, are caused to be turned by the turning of the wheel, pulley, or roll upon them. This is an undesirable mechanical condition, because the working of the stud in its holding-holes, which have not been prepared for such service, is apt to injure the stud and its support, and thus cause the part which should turn upon the stud to run with greater friction than is necessary and often more or less irregularly and out of line.

The invention herein described consists in means whereby the stud may be secured to its support so as constantly to be held rigidly and stationary, and it comprises a coupling, which is interposed between the cotter or other pin that is usually employed for preventing the stud from moving endwise in its support and said support, and which coupling is so constructed as to receive a part of the stud to make engagement with said stud-pin, whereby it is prevented from turning, and to also make engagement with the stud-support or other rigid support, whereby it also is prevented from turning. The means for engaging the stud-pin with the coupling may also be used for preventing endwise movement of the pin in the stud, and the coupling may also be provided with means for automatically spreading the parts of a cotter-pin and so that in the act of driving the pin it is also caused to be secured to the stud.

I will now describe the invention in connection with the drawings forming a part of this specification, wherein—

Figure 1:
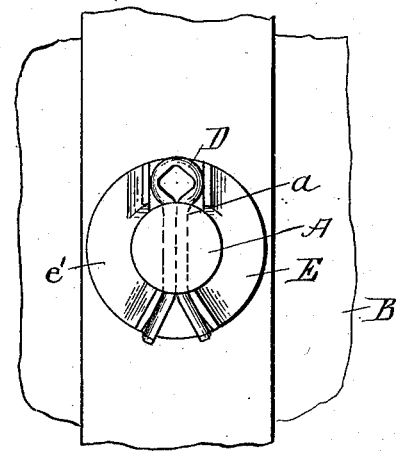
Figure 2:
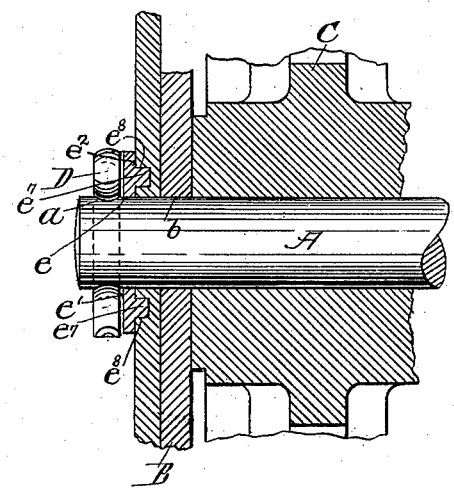

Figure 1 is a view in side elevation of my improved coupling as applied to strap-block. Fig. 2 is a detail view, principally in vertical section, of the parts shown in Fig. 1, a portion of a sheave mounted upon the stud also being shown. Figs. 3 to 14, inclusive, are views similar to that of Fig. 1, showing different embodiments of the means connecting the stud with the coupling.

Referring to the drawings, A represents a stud upon which a wheel, pulley, or other rotatable thing is adapted to be mounted to turn. The stud is shown as applied to a block B by extending through a hole formed in the side or through the rigid portion thereof and carrying a sheave C, while D represents a cotter-pin used to secure the end of the stud. While the drawings show but a portion of the block, sheave, and stud and with the cotter-pin applied to but one end thereof, yet the other end of the stud may be similarly fitted to receive a cotter-pin. The usual construction, however, is to head one end of the stud.

The cotter-pin is of any desired type and is combined with the stud by means of the hole $a$ therein in the usual manner. It is locked in place by spreading its ends, as shown in Fig. 1, or by means of an engaging or holding part of the coupling E, adapted to prevent it from moving endwise in the stud-hole.

The coupling E is preferably annular in shape, having a central hole $e$, through which the end of the stud extends, and inner and outer surfaces $e'$ and $e^2$, which are parallel and from which on one side extend the pin-holding means and upon the other side the coupling-holding means.

The pin-holding means serve primarily to prevent the stud from turning and the coupling-holding means prevent the coupling from turning. The pin-holding means comprises one or more lateral projections with which the pin so engages as to be immovable so far as turning is concerned in either direction, and these holding means may be in the form of a single projection or in the form of two or more pairs of abutments. The pin-holder may also be used for preventing the pin from endwise movement in the pin-hole in the stud.

I will first refer to the pin-holders which have both functions. These are illustrated in Figs. 5, 6, 7, 8, 9, and 10, and of these figures Figs. 5, 6, 9, and 10 show abutments $e^3$, forming a socket adapted to receive and hold the head of the pin and prevent its endwise movement, while Figs. 7 and 8 show the engaging device extending from the coupling in the form of a pin $e^4$ to enter a hole $e^5$ in the head $e^6$ of the stud, and so prevent it from moving endwise.

With couplings having a holding-pin $e^4$ for engaging the cotter-pin or a socket which is partially inclosed it will be necessary to provide the stud with which the cotter-pin is used with an endwise movement toward the coupling or with a similar movement of the coupling toward the cotter-pin in order that the cotter-pin and coupling may make the desired engagement. These means for locking the cotter-pin as against endwise movement may also be used to secure the coupling to the stud, or vice versa, in such a manner that the stud is locked to the coupling and cannot be turned upon it. They form abutments which prevent the turning of the stud and the cotter-pin in either direction. Abutments for thus holding the cotter-pin and coupling may be used, which do not act to prevent the cotter-pin from having endwise movement, and such are shown in Figs. 3 and 4, where the cotter-pins are held in place in the stud by their heads and by spreading their split ends in the usual manner.

Figure 5:
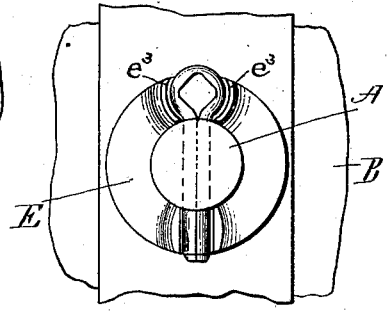

Referring now specifically to each figure representing an embodiment of my invention, I would say that in Fig. 5 I have shown two pairs of the coupling-abutments, which are separated from each other by the hole $e$, through which the stud A extends, and which abutments engage both sides of both ends of the cotter or other pin on each side of the stud-hole. This is also true of the structure of Fig. 9.

Figure 3:
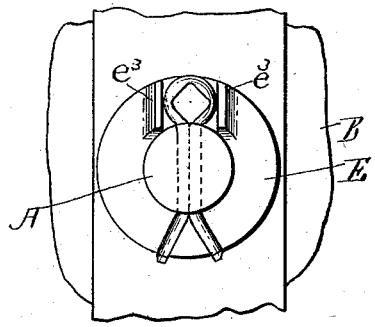
Figure 4:
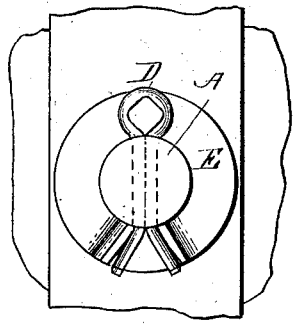
Figure 6:
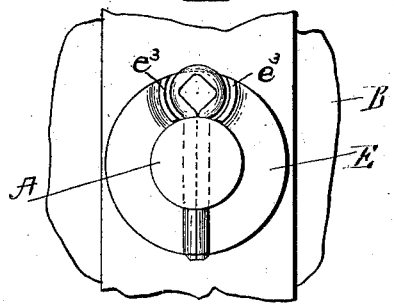
Figure 7:
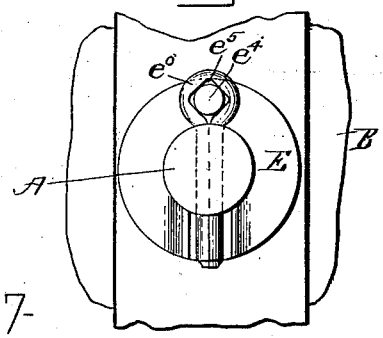

In Figs. 3, 6, and 10 the pin-abutments are represented as arranged to engage both sides of the head of the pin only and in Fig. 4 to engage the spread end of a cotter-pin only.

In Fig. 11 the coupling is represented as having depressed recesses closed at their ends and opening from the central hole for receiving and holding the stud and prevent it from moving endwise.

I do not confine myself to these ways of connecting the stud and coupling, and whatever way may be employed for the purpose the coupling also has means for engaging it to the support or bearing for the stud or some other stationary or rigid support, and this means comprises one or more pins or projections $e^7$ from the inner surface $e^2$ of the coupling, which enters a corresponding hole or holes $e^8$ in said rigid support and so that the coupling is secured to such a support in a manner to prevent its turning, and is thus held rigidly against the turning strain of the stud-holding pin, which is held to the coupling by the pin-abutments. Where two pins are used, I prefer to arrange them opposite each other and back of the pin-holding abutments. (See Fig. 2.)

In Fig. 12 I have represented the coupling as provided, in addition to the pin-holding abutments, with a heading device $e^9$, formed integral with it, having one or more inclined surfaces and so placed as to deflect the end of the pin driven against it. With a cotter-pin, for instance, it would separate the ends and bend them outward uniformly, as represented.

In Figs. 9 and 10 the upper abutments are represented as extended beyond the edge of the coupling-plate. This is for the purpose of permitting them to be turned from a straight position to an inward curved position, as represented in the figures, and so as to hold the pin from endwise movement.

The advantages of the invention have been given in conjunction with the description of its construction and application.

Having thus fully described my invention, I claim and desire to secure by Letters Patent of the United States—

1. A block having a stud and a stud-pin and in combination therewith means for preventing said stud from turning, the same comprising a coupling interposed between the stud-pin and the rigid portion of the block through which the stud passes, the said coupling comprising a plate having a hole through which the stud extends and formed upon its one side with means for holding and preventing the stud-pin from turning relatively to it and upon its other side with means for engaging the said rigid portion of the block.

2. As a separate article of manufacture, a stud-coupling of the character specified, the same comprising a plate having a hole through which the stud is adapted to pass, there being formed upon its one side means extending for engaging a stud-pin in a manner to hold said pin from turning thereon, and means extending from its other side whereby said plate is held in a relatively fixed position against turning.

3. As a separate article of manufacture, a stud-coupling of the character specified, the same comprising a plate having a hole through which the stud is adapted to pass and relatively flat, parallel surfaces, there being means extending from one surface for engaging the stud-pin in a manner to hold said pin from turning thereon and from endwise movement, and means extending from the other surface whereby said plate may be held in a relatively fixed position against turning.

4. As a separate article of manufacture, a stud-coupling of the character specified, the same comprising a plate having a hole through which the stud is adapted to pass and formed upon its one side with projections for receiving and holding a stud-pin, and which projections are adapted to be headed while the said cotter or similar pin is being driven whereby the same may be held against endwise movement, and formed upon its other side with engaging means whereby said plate may be held relatively fixed against turning.

ALFRED B. TARBOX.

In presence of—
J. M. DOLAN,
SAUL SIPPERSTEIN.